United States Patent Office 3,342,685
Patented Sept. 19, 1967

3,342,685
VITAMIN-CATION EXCHANGE RESIN THERAPY AND METHOD OF ELIMINATING DRUG ODOR
Stephen Paul Rety, Wilfred Herbert Linnell, and Herbert Timmington, Richmond, England, assignors to Clinical Products Limited, Slough, England, a British company
No Drawing. Filed Oct. 1, 1958, Ser. No. 764,487
Claims priority, application Great Britain, Oct. 3, 1957, 31,020/57
7 Claims. (Cl. 167—81)

It is desirable in the field of therapeutics to provide preparations adapted to give sustained release of drugs in the body when administered by the mouth. It has previously been proposed to use physical methods for retarding the release of the drug, e.g., by making tablets which disintegrate slowly, or by coating pellets with slowly soluble films.

It has been found that a more continuous and uniform release of a drug over a long period of time can be obtained if the drug is chemically bound to a solid carrier, from which it is slowly released by the action of the normal contents of the gastro-intestinal tract.

Drugs or therapeutic agents which can usefully be administered by the mouth can be classified as basic agents capable of combining with an appropriate cationic ion-exchange resin to form what may be termed a resinate, or again as an acidic agent capable of combining with an appropriate anionic ion-exchange resin to form a resin-drug compound which would be a salt of the resin acting as a base and the drug acting as an acid.

It is the object of the present invention to provide a method of production of a number of resinate-type compounds, prepared from drugs acting as a base and such resins acting as an acid, these compounds having a slow and even rate of release of the drug when acted upon by the normal contents of the gastro-intestinal tract. In some instances also, the chemical combination of the drug with the resin has the result of forming a non-odorous salt of an odorous drug, the drug being however released with its full normal effects when in the body.

According to the present invention, a suitable acidic cationic exchange resin, e.g., a resin consisting of a polystyrene polymer cross-linked with divinylbenzene and containing either sulphonic acid groups or carboxylic acid groups, is combined with a basic drug, e.g., a vitamin, to form a resinate of the drug.

Suitable resins containing sulphonic acid groups and carboxylic acid groups, are commercially available. An example of the former is a polystyrene polymer cross-linked with varied amounts of divinylbenzene. An example of the latter is a cross-linked methacrylic acid resin of high stability.

Drugs susceptible to this treatment are, for example, thiamine or aneurine (e.g., as aneurine hydrochloride), riboflavin, and pyridoxine.

The salt formed with the sulphonic acid resin may be represented by the following general formula structure, exemplified by aneurine resinate:

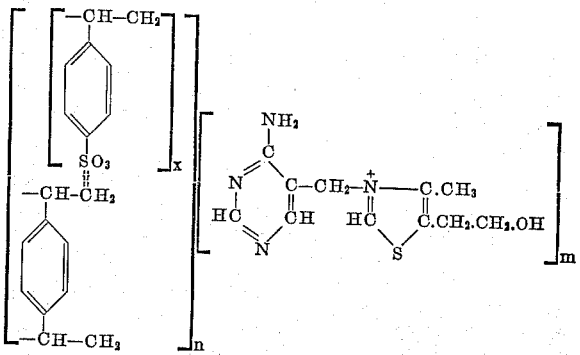

"X," the degree of cross-linkage of the resin, may be within the range 5 to 100 inclusive. That is, the cross-linking may vary from 20% to 1% (or one molecular unit of divinyl benzene to five units of styrene [20%] on one hand, to one unit of divinyl benzene to one hundred molecular units of styrene [1%]).

The value $m/n$ represents the degree of saturation of the resin with the drug, and can be varied. Greater degrees of saturations may be obtained, for instance, by successive reactions with further solutions of the aneurine hydrochloride.

The resinates formed are completely insoluble in solvents and also without odor, but react with hydrogen chloride (e.g., in the stomach) or sodium chloride (e.g., in the gut) to form the free resin in the hydrogen or sodium form, together with the drug in hydrochloride form. This reaction is slow in contact with the concentration of ions in the gastro-intestinal tract of man or woman, and thus the salt may be used to produce an evenly sustained therapeutic effect over an extended period of time.

A typical release picture, that of aneurine hydrochloride from aneurine resinate, is given below:

| Hours: | Amount of aneurine hydrochloride released, percent |
|---|---|
| 2 | 8.4 |
| 4 | 51.8 |
| 6 | 72.1 |
| 8 | 79.6 |

The preparation of aneurine resinate may be taken as representative of the preparation of other similar resinates, such as pyridoxine resinate.

The resinate is prepared as follows:

A 10% solution of the hydrochloride of the drug, e.g., aneurine hydrochloride, is prepared accurately and its pH value determined. 100 mils of this solution are reacted with an appropriate quantity of resin. When the resultant pH of the solution becomes constant, the insoluble resinate is removed, washed with water until free from chloride ion, washed with acetone, and finally dried at a temperature not exceeding 80° F. until the moisture content does not exceed 2%.

The aneurine in the un-combined state has an unpleasant odor, but when combined with the resin in the form of a resinate in the manner described, the resultant compound is odorless. However, the aneurine is released in the body with its full normal effects.

Modifications in the above process may be made as follows:

(a) More aneurine hydrochloride solution is added to obtain a stronger resinate, i.e., a resinate in which the resin is more nearly saturated with the drug.

(b) The 10% solution of aneurine hydrochloride is prepared in acetone or alcohol.

The resinates produced in this manner are preferably stored in containers which will exclude atmospheric moisture.

We claim:
1. A method of changing the odor of a drug which is normally odorous per se and rendering it more suitable for oral use, which comprises the step of adsorbing said drug upon cation exchange resin.
2. A method of eliminating the odor of thiamine and preparing a composition thereof for oral use, which comprises adsorbing thiamine upon cation exchange resin.
3. A method of vitamin therapy which includes the step of administering a vitamin selected from the group consisting of thiamine, riboflavin and pyridoxine while said vitamin is adsorbed upon cation exchange resin.
4. A method of vitamin therapy which includes the step of administering thiamine while said thiamine is adsorbed upon cation exchange resin.

5. A method of vitamin therapy which includes the step of administering riboflavin while said riboflavin is adsorbed upon cation exchange resin.

6. A method of vitamin therapy which includes the step of administering pyridoxine while said pyridoxine is adsorved upon cation exchange resin.

7. A method of thiamine therapy which comprises administering a thiamine product while said product is adsorbed upon cross-linked sulfonated polystyrene cation exchange resin.

References Cited

UNITED STATES PATENTS

| | | | |
|---|---|---|---|
| 2,498,687 | 2/1950 | Larson | 167—65 |
| 2,677,670 | 5/1954 | Kunin | 260—2.2 |
| 2,830,933 | 4/1958 | Bouchard | 167—81 |

FOREIGN PATENTS

| | | |
|---|---|---|
| 556,388 | 4/1957 | Belgium. |

OTHER REFERENCES

Anastasi: Ind. Chemique Belge, vol. 20, 1955, pp. 468–474.

Calmon: Ion Exchangers in Organic and Brochem., Intersciene Pub. Co., New York, 1957, pp. 150–151.

Chaudhry, J.: Pharm. and Pharm., November 1956, pp. 975–986.

Herr: Ind. & Eng. Chem., July 1945, pp. 631–634.

Ind. and Eng. Chemical, 41, 3, March 1949, pp. 462–463.

Saunders, J.: Pharm. and Pharm., 5, 9, September 1953, pp. 569–579.

Winters: Drug and Allied Industries, July 1950, pp. 19–24.

ALBERT T. MEYERS, *Primary Examiner.*

MORRIS O. WOLK, WILLIAM B. KNIGHT, IRVING MARCUS, *Examiners.*

A. P. FAGELSON, *Assistant Examiner.*